(No Model.) 6 Sheets—Sheet 1.

McC. YOUNG.
MACHINE FOR BENDING HINGE BLANKS.

No. 396,319. Patented Jan. 15, 1889.

Witnesses:
Inventor,
McClintock Young
By Phil. T. Dodge
Attorney.

(No Model.) 6 Sheets—Sheet 2.

McC. YOUNG.
MACHINE FOR BENDING HINGE BLANKS.

No. 396,319. Patented Jan. 15, 1889.

Witnesses.
W. W. Mortimer
W. R. Kennedy.

Inventor,
McClintock Young.
By Phil T. Dodge
Attorney.

(No Model.) 6 Sheets—Sheet 3.

McC. YOUNG.

MACHINE FOR BENDING HINGE BLANKS.

No. 396,319. Patented Jan. 15, 1889.

Fig. 3.
ON LINE Z-Z

Witnesses, Inventor,
Fig. 7. Fig. 8. McClintock Young
ON LINE 1-1 ON LINE 2-2 By Phil. T. Dodge
Attorney.

(No Model.) 6 Sheets—Sheet 4.
McC. YOUNG.
MACHINE FOR BENDING HINGE BLANKS.

No. 396,319. Patented Jan. 15, 1889.

(No Model.) 6 Sheets—Sheet 5.

McC. YOUNG.
MACHINE FOR BENDING HINGE BLANKS.

No. 396,319. Patented Jan. 15, 1889.

Fig. 10.
ON LINE Y–Y

Fig. 11.

Witnesses,
W. W. Mortimer
N. R. Kennedy.

Inventor,
McClintock Young
By Phil. T. Dodge
Attorney.

(No Model.) 6 Sheets—Sheet 6.

McC. YOUNG.
MACHINE FOR BENDING HINGE BLANKS.

No. 396,319. Patented Jan. 15, 1889.

Witnesses.
W. W. Mortimer.
W. R. Kennedy.

Inventor,
McClintock Young.
By Phil. T. Dodge,
Attorney.

UNITED STATES PATENT OFFICE.

McCLINTOCK YOUNG, OF FREDERICK, MARYLAND.

MACHINE FOR BENDING HINGE-BLANKS.

SPECIFICATION forming part of Letters Patent No. 396,319, dated January 15, 1889.

Application filed November 15, 1888. Serial No. 290,948. (No model.)

*To all whom it may concern:*

Be it known that I, McCLINTOCK YOUNG, of Frederick, in the county of Frederick and State of Maryland, have invented certain Improvements in Machines for Bending Hinge-Blanks, of which the following is a specification.

The object of this invention is to provide a machine by which the edges of hinge-blanks may be automatically and rapidly bent into tubular form to receive the pintles or hinge-pins.

My machine embraces as its essential elements one or more reservoirs to receive the blanks in quantity, reciprocating feed devices by which the blanks are removed one at a time from the bottom of the reservoir, an endless intermittingly-moving chain in which the blanks are delivered by the feeder and by which they are presented to the two bending mechanisms in succession and finally delivered from the machine, a mechanism for intermittingly moving and locking the carrying-chain, a clamp and co-operating dies to which the blanks are presented by the carrying-chain and by which the blanks receive a primary bending, and a second bending-die to which the blanks are presented by the chain and by which the bending operation is completed. It also embraces various details in the mechanism for imparting motion to the parts above named and for adjusting the various parts to receive and operate upon blanks of different sizes and forms.

In the accompanying drawings.

Figures 12, 13, 16, 17:
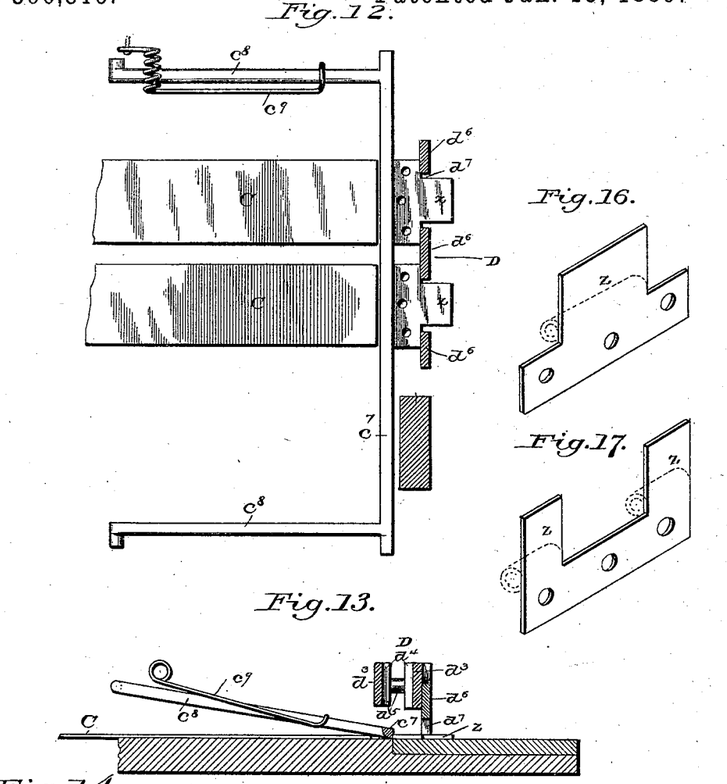
Fig. 12 is a plan view, on an enlarged scale, of the feed-slides, the detent, and adjacent parts.
Fig. 13 is a vertical cross-section of the same.
Figs. 16 and 17 are perspective views of the hinge-blanks.

In order that the construction and operation of my machine may be more readily understood, it should first be explained that the machine receives ordinary flat hinge-blanks—such as are shown in Figs. 16 and 17—intended to form the primary leaves of a hinge. One of these blanks has a single ear or projection, $z$, at its middle, while the other is constructed with two projections $z$ at its ends. The office of the machine is to bend these projections $z$ into tubular form, as represented by the dotted lines.

I will now describe the operations of the machine in detail.

*Main frame.*—Referring now to the construction of the machine, A represents a rigid base-frame, which may be of any form adapted to sustain the various operative parts hereinafter described. At the top this frame presents a horizontal bed or surface, on which the principal parts of the machine are supported.

Figure 3:
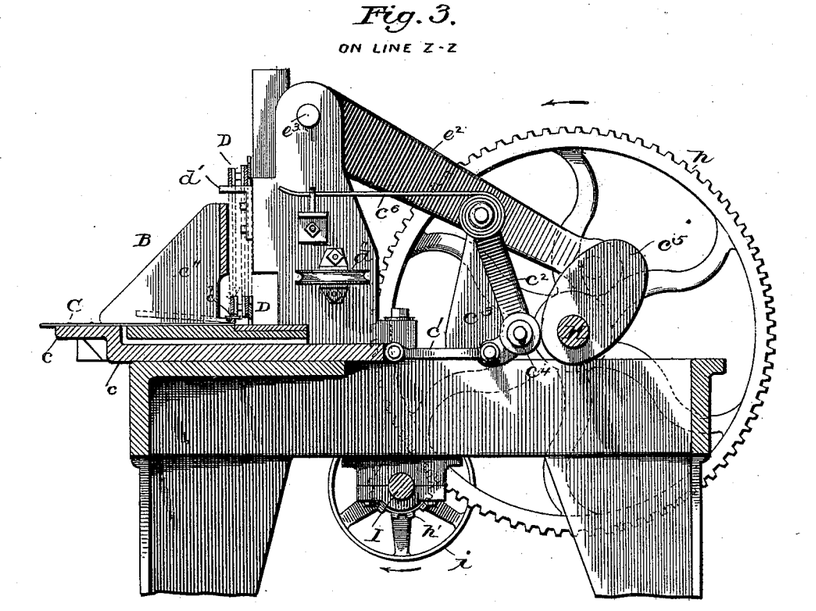
Fig. 3 is a vertical section of the machine from front to rear on the line $zz$, Figs. 1 and 2, showing more particularly the feed mechanism.

*Reservoir and feed mechanism.*—B represents a reservoir or box to receive the blanks, located on the front of the machine near the right-hand corner. This reservoir, the details of which will be hereinafter described, is divided into two vertical compartments, in which the hinge-blanks $z$ are stacked, one upon another, in two columns. The blanks are delivered from this reservoir, one at a time from each column, to the carrying-chain by means of horizontal reciprocating feed-slides C, which are adjustably attached at their outer ends to a slide, $c$, seated in a suitable guideway in the main frame, and connected, as shown in Fig. 3, by links $c'$, to the lower end of an arm, $c^2$, pivoted to a standard, $c^3$, on the main frame. A roller, $c^4$, attached to the arm $c^2$, is acted upon by a cam, $c^5$, by which the arm and slide are moved forward. A spring, $c^6$, attached at one end to the arm $c^2$ and at the other end to the main frame, serves to throw the arm $c^2$ and the slides rearward as the cam $c^5$ retreats. The cam first acts to move the parts forward and carry the feed-slides C from under the blanks in the columns, which latter then descend, so as to present the bottom blanks opposite the ends of the feed-slides. As the cam retreats, the spring $c^6$ causes the feed-slides C to move rearward and carry the bottom blanks before them out of the reservoir to the carrying-chain hereinafter described. In order to prevent the outgoing blanks from carrying those which rest upon them, I provide a detent consisting of a bar, $c^7$, which lies horizontally across the rear or delivery side of the reservoir, being sustained by pivoted arms $c^8$ at its ends and pressed downward by springs $c^9$. This bar is rounded on the under side next to the reservoir, so that as the bottom blanks are pressed forward by the feed-slide they will underride and lift the detaining-bar, which will then lie behind the next blanks above to prevent them from passing outward.

Figure 14:
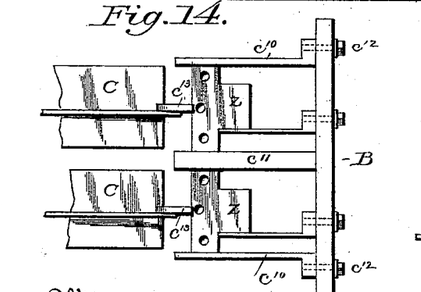
Fig. 14 is a plan view, on an enlarged scale, of the reservoir for the blanks.
Figure 15:
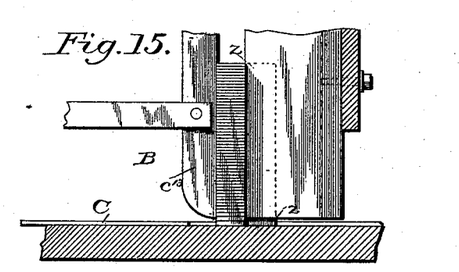
Fig. 15 is a vertical cross-section of the same.

The reservoir may be constructed in any suitable manner; but in order that it may be adjusted for blanks of different forms I provide it with side walls, $c^{10}$, which are adjustable to and from the center wall, $c^{11}$. These side walls may be secured by bolts $c^{12}$, passing through horizontal slots in the rear wall of the reservoir, (see Fig. 14,) or by other equivalent adjusting devices, of which there are many, familiar to every skilled mechanic. The rear wall of the reservoir $c^{17}$ has at one end the flange $c^{18}$, slotted in a fore and aft direction and secured to the bed or frame by a bolt, $c^{19}$, which permits the reservoir as a whole to be adjusted forward and backward.

To prevent the blanks from being drawn forward with the retreating slide, the reservoir is provided with upright rods $c^{13}$, having horizontal arms, which are passed through sustaining-posts $c^{14}$, and secured by screws $c^{15}$. The posts $c^{14}$ are constructed after the manner of the familiar tool-posts of a lathe, and are adjustable laterally in the slotted supporting-plate $c^{16}$, so that the uprights $c^{13}$ may be placed opposite the middle of blanks of different sizes.

From the foregoing it will be seen that the reservoir and its internal parts are universally adjustable, so that they may be adapted to receive blanks of different forms and sizes.

Figure 1:
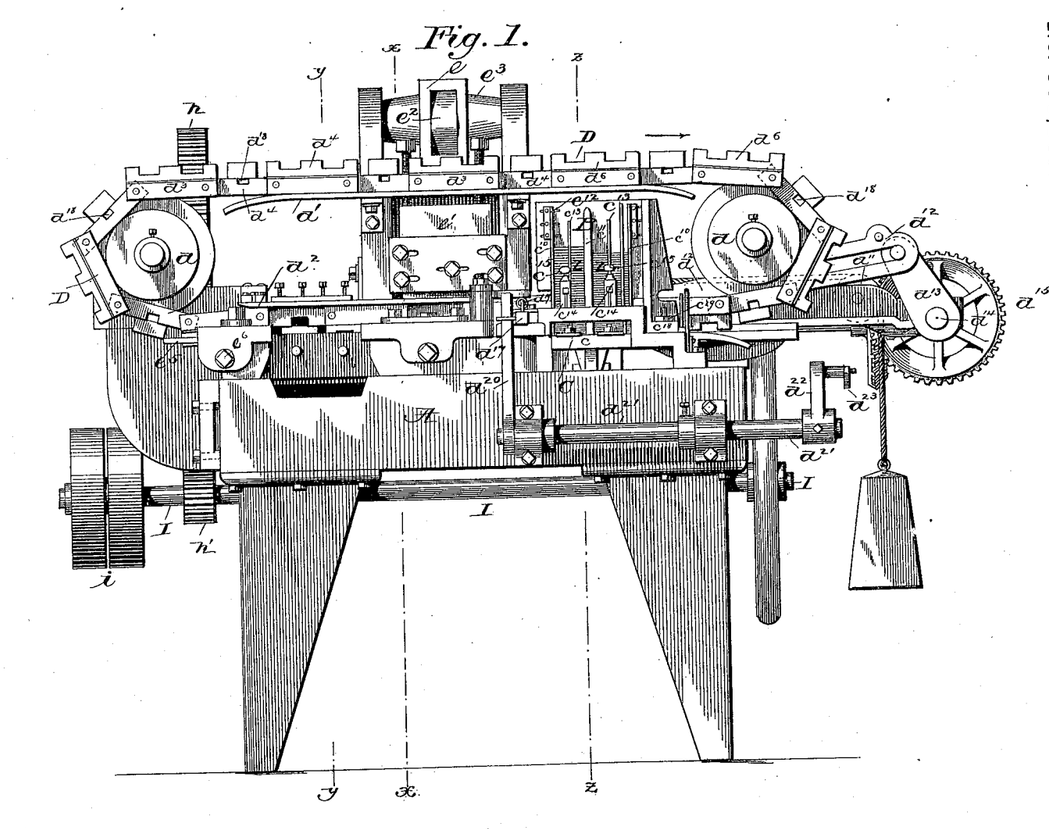
Figure 1 is a front elevation of my machine.

*Carrier-chain.*—D represents the endless carrier-chain arranged to travel horizontally around supporting-wheels $d$, mounted on horizontal axes on the main frame. These wheels have, as shown, narrow peripheral flanges, which enter a longitudinal groove in the inner or back side of the chain, whereby the chain is accurately guided and prevented from shifting laterally. The chain is further guided by means of an upper stationary plate or rail, $d'$, and a lower stationary rail, $d^2$. The chain travels below the lower guides, $d^2$, upon the top or bed of the main frame immediately in rear of the feed-slides C, and at right angles thereto, as shown in Figs. 1 and 3, and indicated in dotted lines in Fig. 2. The chain may be constructed in any suitable manner, provided it is adapted to receive and carry the blanks, as hereinafter explained; but I prefer to retain the details of the construction represented in Figs. 4, 5, and 6. The body of the chain consists of parallel links or plates $d^3$ and $d^4$, arranged vertically in pairs and connected by cross-pivots $d^5$. On one side of the chain notched plates $d^6$ are removably secured to the links $d^3$, their edges extending beyond the chain. The notches $d^7$ in these plates are ranged in such position that they lie next to the bed or table on the under side of the chain, and they are made of suitable form to receive the projecting tongues or ears of the blanks, each plate receiving the tongues of two blanks as the latter are driven from the reservoir by the feed-slides C.

Figures 4, 5:
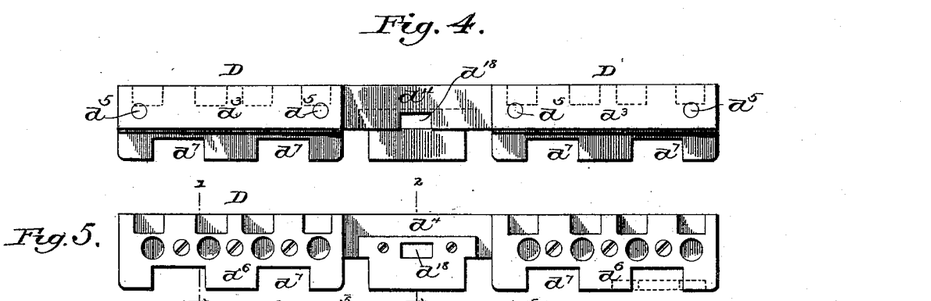
Figs. 4, 5, and 6 are respectively a front, a rear, and a bottom view of a portion of the carrying-chain.

As shown in Fig. 5, the plates $d^3$ are reversibly attached to the chain and provided with notches in both edges. In one edge there are two single notches, designed to receive the tongues of blanks such as shown in Fig. 12; and in the other edge there are two pairs of notches intended to receive the ears of blanks, such as shown in Fig. 13. Thus it is that, by reversing the plates $d^3$, or, in other words, turning them end for end, the chain may be adapted to feed blanks of either form.

Figures 6, 7, 8:
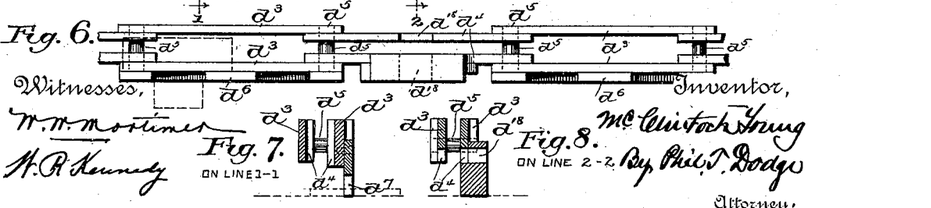
Figs. 7 and 8 are cross-sections of the same on the lines 1 1 and 2 2, respectively.

The blanks are fed beneath the body of the chain, and their tongues or ears project through the plates at the rear side, as shown by dotted lines in Figs. 6 and 7.

The chain receives an intermitting forward movement, standing at rest to receive the blanks and then moving forward with the blanks during the retreat of the feed-slides. The intermitting motion of the chain is produced by means of a spring-actuated pawl or dog, $d^8$, (see Fig. 2,) mounted on a slide, $d^9$, which is urged constantly forward by a weighted cord, $d^{10}$, passing around suitable guide-pulleys, $d^{11}$, on the main frame. The slide and dog are retracted by means of a pitman, $d^{12}$, attached at one end to the slide and slotted at the opposite end, as shown in Fig. 1, to receive the wrist-pin of a crank, $d^{13}$. The crank effects the positive retraction of the dog, but leaves it free to stop, provided it meets a serious resistance which the weighted cord is unable to overcome. The crank $d^{13}$ is carried by one end of a horizontal shaft, $d^{14}$, mounted in bearings in the main frame and connected by miter-gear $d^{15}$ $d^{16}$ to the main driving-shaft H, which is seated horizontally in bearings in the main frame. This shaft carries the feed-cam $c^5$, before alluded to, and various other cams yet to be described. The shaft receives motion through a large spur-wheel, $h$, from a pinion, $h'$, on a primary driving-shaft, I, which is also mounted in horizontal bearings in the main frame and provided with suitable driving-pulleys.

After the feed devices have delivered two of the blanks into one of the chain-plates $d^3$, the dog acts to advance the chain until the plate $d^3$ and the blanks therein are presented to the first or primary bending devices; the next plate $d^3$ is in position to receive blanks, the chain and the feed-slides advancing alternately.

Figure 2:
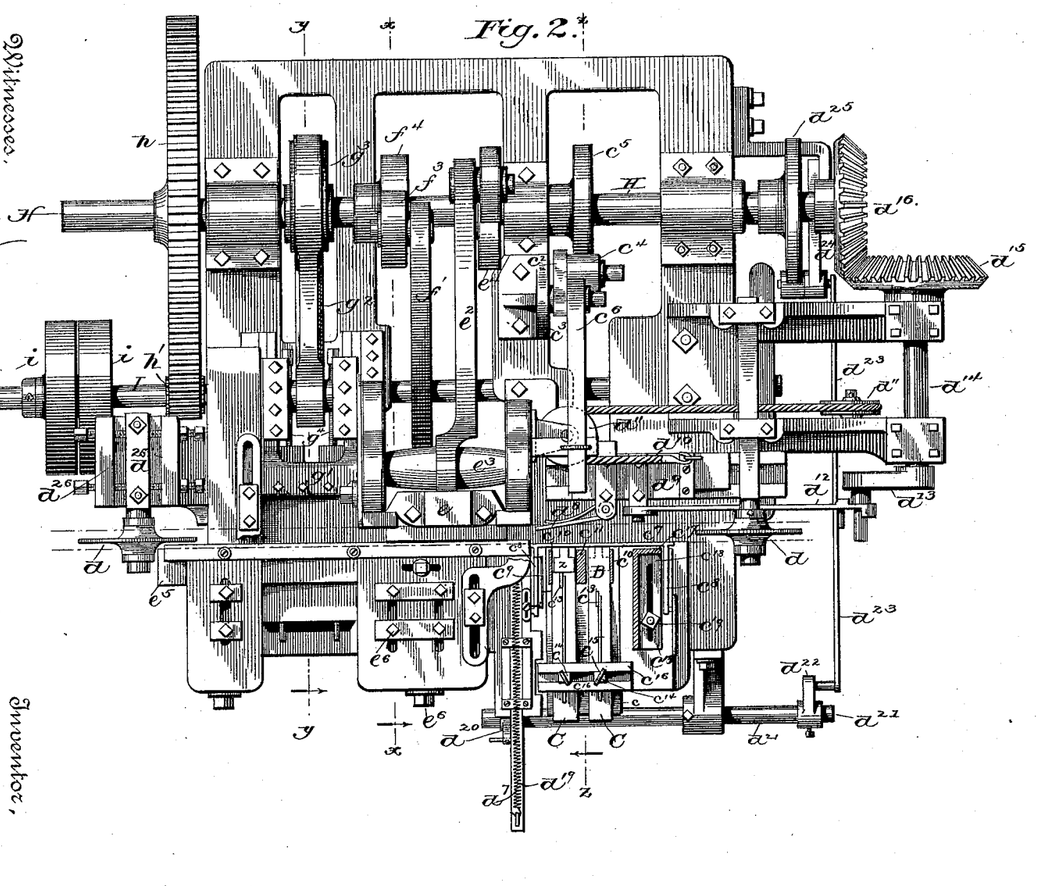
Fig. 2 is a top plan view of the same, the carrying-chain for the blanks and its upper guide being omitted to expose other parts to view.
Figure 11:
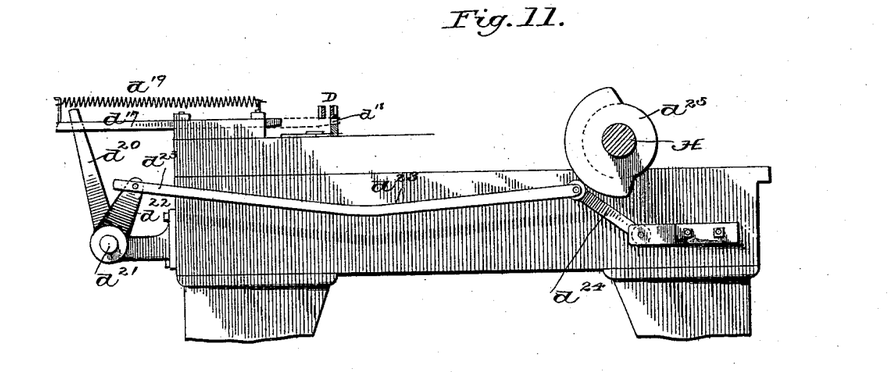
Fig. 11 is a vertical cross-section on the line $zz$, Figs. 1 and 2, showing the mechanism for holding the carrying-chain at rest during the action of the bending-dies.

In order to lock the chain in position during its periods of rest, I provide a locking-bolt, $d^{17}$, which slides in suitable guides on the frame at right angles to the length of the chain, and the inner end of which is tapered and adapted to enter holes $d^{18}$, formed in the chain, as shown in Figs. 4, 5, 6, and 11. This bolt is urged into engagement by a spring, $d^{19}$, and is retracted, as shown in Figs. 2 and 11, by an arm, $d^{20}$, on one end of a rock-shaft, $d^{21}$, which is provided with a second arm, $d^{22}$, connected by a rod, $d^{23}$, to a pivoted arm, $d^{24}$, which is in turn acted upon by a cam, $d^{25}$, on the main shaft H. Of course the chain-feeding dog and the locking bolt alternate in their action.

Figure 9:
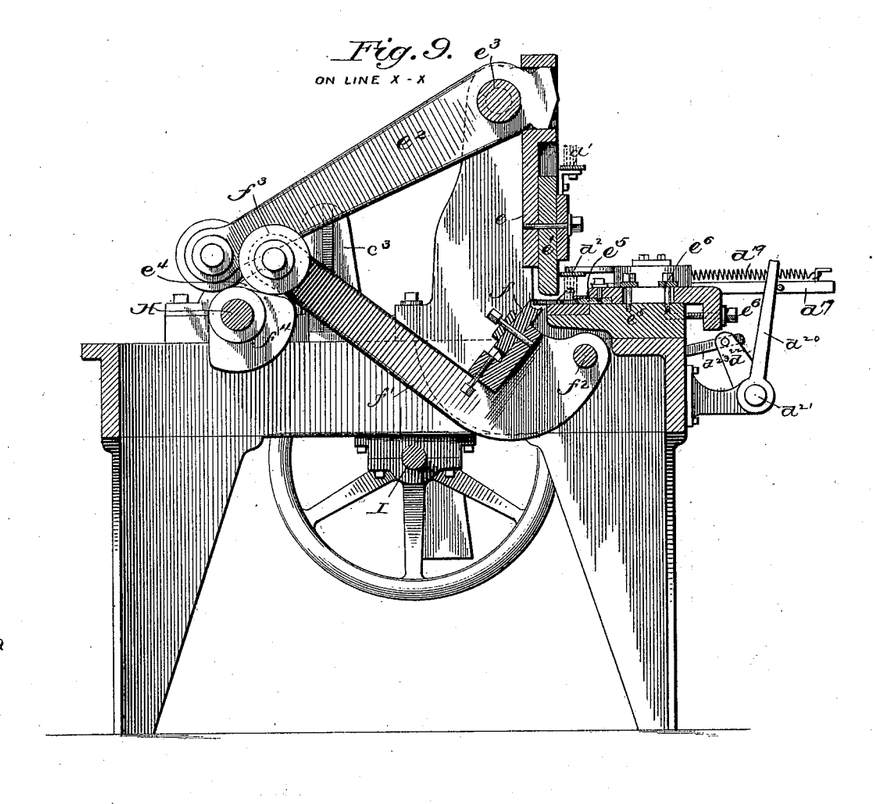
Fig. 9 is a vertical cross-section of the machine on the line $xx$, Figs. 1 and 2, showing more particularly the first bending mechanism.

*Primary bending mechanism.*—The mechanism for imparting the primary or initial bend to the blank is shown in Figs. 1 and 9. It consists of a vertical slide, $e$, suitably guided in the main frame, and arranged to descend immediately in rear of the carrying-chain and act upon the projecting ears or tongues of the blanks, so as to hold them down firmly in place on the bed. The lower end of the slide $e'$, being the portion which acts directly on the blanks, is bolted to the main portion and is adjustable vertically therein, so that it may be adapted to operate on blanks of different thicknesses. The slide $e$ is actuated by a lever, $e^2$, which is sustained between standards on the main frame by a journal or pivot-pin, $e^3$. One end of this lever is fitted into an opening in the slide, while the opposite end is provided with an anti-friction roller riding on top of a cam, $e^4$, on the main shaft. The cam lifting the rear end of the lever depresses the clamping-slide $e$ and holds the same down during the action of the bending devices. When the cam retreats, the rear end of the lever descends by gravity and lifts the clamp. The extreme edge of the blank projects beyond the clamping-slide and the supporting-surface of the bed or frame, as shown in Fig. 9, and is acted upon by a concave die, $f$, rigidly but adjustably supported in a lever, $f'$, which latter is supported at one end by a horizontal pivot, $f^2$. At the opposite end the lever is provided with an anti-friction roller, $f^3$, which rides on the cam $f^4$ on the main shaft, this cam being suitably shaped and adjusted to elevate the lever and force the die against the exposed edge of the blank during the time that the latter is held by the clamping devices. It will be understood that the recess in the edge of the die extends horizontally and is of approximately-semicircular form in cross-section, so that when the die is forced against the edge of the blanks it will give a slight upward curvature to their tongues. In order to prevent the blank from moving forward under the pressure of the die, it is supported at the front edge by an anvil, $e^5$, having a vertical face to bear against the blank, and a horizontal lip to rest over its top, as clearly shown. This anvil is secured to the frame by means of bolts $e^6$, which admit of its being adjusted horizontally to suit the width of the blank.

The clamping and bending devices just described act at times when the chain is at rest. After they have acted the die and the clamping-slide $e$ are withdrawn, and the chain advances, carrying the partially-formed blanks to the second or final bending mechanism.

Figure 10:
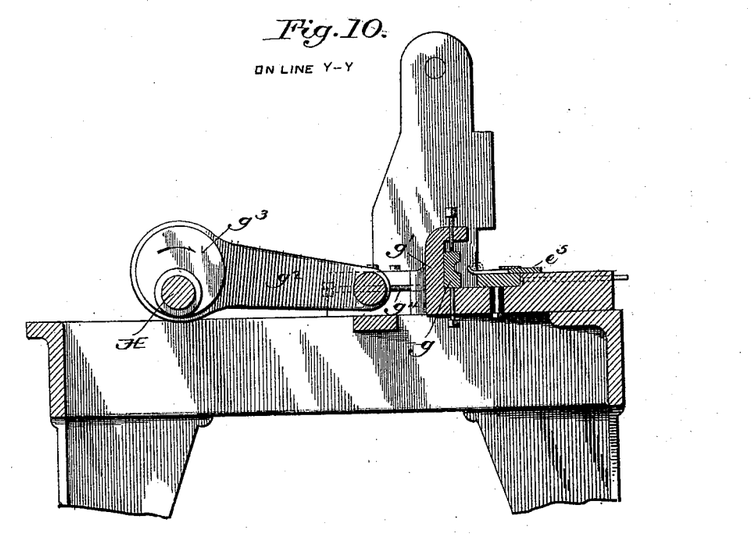
Fig. 10 is a section on the line $yy$, Figs. 1 and 2, showing the second bending mechanism, minor parts being omitted to avoid confusion.

*Final bending mechanism.*—This mechanism (shown in detail in Figs. 2 and 10) consists, essentially, of a concave die, $g$, and a horizontal reciprocating head, $g'$, in which the die is adjustably mounted. The groove in the die extends horizontally and is of substantially semicircular form in cross-section. The blanks having the edge slightly curled, as shown in Fig. 10, are presented directly in front of the die $g$, resting upon the bed or table, and held at the forward edge by the anvil $e^5$, already described. As the die advances it acts against the curled edge of the blank and causes the same to curl or turn inward upon the body portion until it assumes the familiar tubular form represented by dotted lines in Fig. 10, thereby completing the leaf of the hinge. The die-supporting slide is actuated by a pitman, $g^2$, adjustably connected at one end to the slide and mounted at the opposite end on an eccentric, $g^3$, on the main shaft H. The journal or pivot which connects the pitman to the slide $g'$ is adjustable horizontally by bolts $g^4$, so that the point to which the slide advances may be adjusted as the shape or size of the blanks may require. After the die has completed its action it is withdrawn and the chain advances, the completed leaf being carried forward with the chain until it reaches the end of the frame, where it falls from the machine.

It will of course be understood that each of the bending-dies acts upon two blanks simultaneously. This construction is adopted in order to increase the capacity of the machine. Obviously a single feed-slide could be used in connection with the chain-plates adapted to receive single blanks, in which case the bending-dies would be reduced in width accordingly, so as to shape but a single blank at a time.

In order to maintain the proper tension of the carrier-chain, the sustaining-pulley $d$ at one end may be mounted on a plate, $d^{26}$, adjustable in the direction of the length of the chain. While I have described herein the preferred details of the mechanism for imparting motion to the feed-slide, the carrier-chain, and the bending-dies, it is to be understood that these details are not of the substance of my invention, as the parts named may be operated by other mechanisms, of which there are a great number known to every skilled mechanic and used for imparting similar motions to operative parts of other machines.

Having thus described my invention, what I claim is—

1. In combination with a reservoir, B, and a reciprocating feed-slide at its base, the upwardly-yielding detent $c^7$, overlying the slide at the delivery side of the reservoir, whereby the outgoing blank is prevented from carrying those above.

2. In a machine for bending hinge-blanks, the reservoir comprising the wall $c^{11}$, the laterally-adjustable walls $c^{10}$, and the adjustable uprights $c^{13}$.

3. In a machine for bending hinge-blanks, the reservoir, a reciprocating feed-slide at its base, an actuating-slide, $c$, the arm $c^2$, connected to the slide $c$, a cam, $c^5$, to move the feed-slide rearward, and a spring, $c^6$, to move the slide forward.

4. In a machine for bending hinge-blanks, the reservoir having two chambers and laterally-adjustable walls, in combination with a slide, $c$, the mechanism for reciprocating said slide a constant distance, and the feed-slides C, connected to the slide $c$, and adjustable both longitudinally and laterally thereon, whereby the mechanism is adapted to receive and deliver blanks of different shapes and sizes.

5. In a machine for bending hinge-blanks, as a means of carrying the blanks, a bed or table in combination with an endless chain traveling thereover and provided in its edge with recesses to receive the blanks.

6. In combination with the endless chain having notches or recesses to receive the blanks, the reservoir, and a feed-slide moving at right angles to the chain, whereby the blanks are transferred from the reservoir to the chain.

7. In combination with the reservoir, a reciprocating feed-slide, an endless notched chain lying at right angles to the path of the feed-slide, and an operating mechanism, substantially as described, for advancing the slide and the chain alternately.

8. In a machine for bending hinge-blanks, the carrier-chain provided with reversible plates $d^6$, notched in their two edges, whereby the chain may be adapted to carry blanks of different forms.

9. In combination with the carrier-chain the transverse locking-bolt $d^{17}$, adapted to engage said chain.

10. The notched endless carrier-chain and the locking-bolt $d^{17}$, in combination with operating devices adjusted to advance the bolt and the chain alternately.

11. The endless carrier-chain, in combination with the slide $d^9$, the chain-actuating dog attached thereto, the weighted cord to advance the slide and dog, the slotted pitman $d^{12}$, and the crank $d^{13}$, whereby the chain is advanced with an intermitting movement.

12. In combination with the notched carrier-chain and the reciprocating pawl for advancing the same, the chain-locking bolt $d^{17}$, the spring to advance the same, the cam $d^{25}$, and the intermediate connections for retracting the bolt, whereby the chain is advanced intermittingly and locked during its periods of rest.

13. The combination, in a machine for bending hinge-blanks, of a bed or support for the blank, a clamp to confine the blank thereon, with its edge exposed, and a concave die, $f$, arranged to act upon the exposed edge of the blank, whereby the blank is given a primary curvature.

14. The combination, with an anvil or support, $e^5$, of a clamping-slide, $e'$, a concave die, $f$, and a pivoted die-carrying lever, $f'$.

15. In a machine for bending hinge-blanks, the anvil or support for the blank, the slide $e$, provided with a clamping-face, $e'$, its actuating-lever $e^2$, the concave die $f$, its supporting-lever $f'$, and the shaft H, provided with the cams $e^4$ and $f^4$.

16. In a machine for bending hinge-blanks, the combination of a fixed anvil or support, and a movable die, $g$, having a concave surface to act upon the exposed edge of the blank.

17. In a machine for bending hinge-blanks, the combination of an anvil or support, $e^5$, adapted to sustain a blank with its edge exposed beyond the anvil, the die $g$, having the concave face to act upon the exposed edge of the blank, the die-supporting slide $g'$, and the eccentric and pitman for moving said slide.

18. In a machine for bending hinge-blanks, the anvil $e^5$, to sustain the blank, the concave die $g$, its supporting-slide $g'$, the eccentric $g^3$, the pitman $g^2$, and adjustable connections, substantially as shown, between the pitman and slide.

19. In a machine for bending hinge-blanks, the combination of an anvil to support the flat blank, and a bending-die, $g$, having a concave face arranged to reciprocate in a line parallel with the faces of the blank, whereby the die is adapted to act directly against the edge of the blank.

20. In a machine for bending hinge-blanks, the combination, substantially as described, of a bed or table, an endless carrier-chain, and two bending mechanisms arranged adjacent to the chain in position to act successively on the blanks carried thereby.

21. In a machine for bending hinge-blanks, the combination of a reservoir for the blanks, a feed mechanism to deliver the blanks successively therefrom, a primary bending mechanism, a secondary bending mechanism, and a carrier-chain extended past the reservoir, and the two bending mechanisms, whereby the blanks are delivered from the reservoir to the chain and presented by the latter to the action of the two bending mechanisms successively.

In testimony whereof I hereunto set my hand, this 31st day of October, 1888, in the presence of two attesting witnesses.

McCLINTOCK YOUNG.

Witnesses:
EDWIN C. MARKELL,
MARSHALL FOUT.